United States Patent [19]

Spitler

[11] 4,354,786
[45] Oct. 19, 1982

[54] APPARATUS FOR STACKING CONTAINERS ON A PALLET

[76] Inventor: Blaine W. Spitler, 2622 Dayton, Visalia, Calif. 93277

[21] Appl. No.: 132,883

[22] Filed: Mar. 24, 1980

[51] Int. Cl.³ .......................................... B65G 57/30
[52] U.S. Cl. ................................. 414/46; 193/35 SS; 414/68; 414/96; 414/101; 414/110; 198/610
[58] Field of Search ...................... 414/46, 52, 68, 77, 414/95, 96, 101, 110, 82, 118, 119; 193/35 SS; 198/782, 610

[56] References Cited

U.S. PATENT DOCUMENTS

| | | | |
|---|---|---|---|
| 2,703,182 | 3/1955 | Broberg et al. | 414/68 X |
| 2,966,018 | 12/1960 | Currie | 414/46 X |
| 3,013,369 | 12/1961 | Wilson et al. | 414/96 X |
| 3,054,515 | 9/1962 | Nawman | 414/46 |
| 3,096,891 | 7/1963 | Verrinder et al. | 414/96 X |
| 3,392,852 | 7/1968 | Tegner | 414/46 X |
| 3,442,400 | 5/1969 | Roth et al. | 414/95 X |
| 3,732,991 | 5/1973 | Von Gal et al. | 414/77 X |
| 4,094,118 | 6/1978 | Lingl | 414/96 |

FOREIGN PATENT DOCUMENTS 1200259  6/1959  France ............................ 193/35 SS

*Primary Examiner*—Leslie J. Paperner
*Attorney, Agent, or Firm*—Huebner & Worrel

[57] ABSTRACT

An apparatus for stacking containers on a pallet, the apparatus having a conveyor for transporting a horizontal pallet to a loading station, a horizontal plate moving horizontally to and from the loading station in superimposed relation to a pallet in the station, a conveyor which has an elevatable section and transports containers to a stacking station adjacent to the loading station, elements for assembling a row of containers on the section and elevating it together with the row, a clamp adjacent to the station to clamp and support an elevated row while a further row is assembled beneath the elevated row to be raised to the elevated row to form a stack of containers, a pusher for moving successive stacks of containers from the stacking station onto a pack rested on the plate while the plate is at the loading station, and elements for sliding the plate from beneath the pack so that it descends onto the pallet.

9 Claims, 7 Drawing Figures

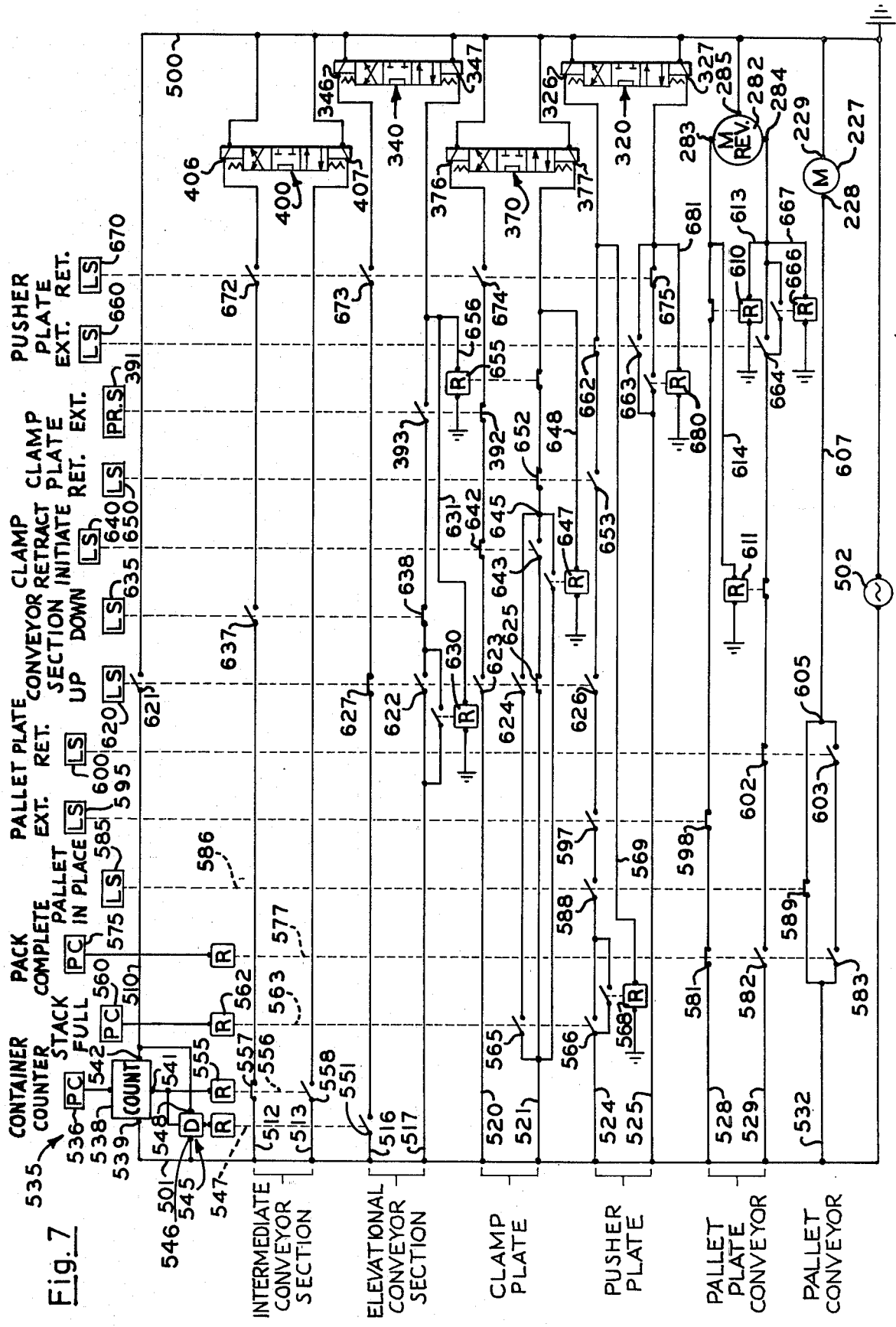

APPARATUS FOR STACKING CONTAINERS ON A PALLET

BACKGROUND OF THE INVENTION

1. Field of the Invention

The present invention relates to an apparatus for stacking containers on a pallet, and more particularly to such an apparatus for automatically stacking a plurality of sequentially presented containers of generally parallelpiped form into a pack rested on a pallet, the pack having a predetermined number of the containers disposed in a plurality of rows and the rows arranged in stacks, each having a predetermined number of containers, the apparatus having particular utility for use in commercial packing of agricultural products.

2. Description of the Prior Art

Agricultural products such as fruits and vegetables conventionally are shipped in boxes or containers. The containers for each product are of predetermined dimensions and are of a size which can be manipulated by one person at the destination. Since it is expensive to provide the labor required to handle each container individually at the various stages of storage, loading, transhipment, and unloading, a predetermined number of containers are stacked in a predetermined arrangement on a pallet of a specific dimension so that this number of containers can be handled as a unit.

Heretofore, it has been necessary to stack each pallet manually with the required number of containers. Due to the cost of labor, such manual stacking is expensive. In any event, since this stacking is only required during seasonal harvesting, the necessary labor is frequently difficult to obtain. Further, such manual stacking is dangerous and, if carelessly done, results in stacks which occasionally tumble, damaging and/or wasting the produce and requiring restacking, often at an inconvenient location.

It has therefore long been known that it would be desirable to provide an apparatus which stacks containers on a pallet without human manipulation or attention with the containers being supplied individually to the apparatus until a pallet is fully stacked with the containers disposed in a predetermined array thereon. It has been recognized as essential that such an apparatus assemble the stacks neatly and accurately so that the stacks are secure. It has also long been known as desirable that such apparatus be adaptable to stack a pallet with packs having different numbers and dispositions of containers in the rows and stacks.

PRIOR ART STATEMENT

In conformance with 37 C.F.R. §1.97 and §1.98, the applicant states that he is not aware of any prior art which is relevant to the patentability of the subject invention.

SUMMARY OF THE INVENTION

It is an object of the present invention to provide an improved apparatus for stacking containers on a pallet.

Another object is to provide such an apparatus which disposes the containers on the pallet in a pack having a predetermined number of stacks, each having a predetermined number of rows, and each row having a predetermined number of containers.

Another object is to provide such an apparatus in which the pallet is loaded with a plurality of stacks without injury to the containers and with each stack neatly arranged having each container substantially vertically aligned with the other containers in its stack and each stack in engagement with the adjacent stacks.

Another object is to provide such an apparatus which stacks each pallet without manipulation of the containers and the pallet, other than by the apparatus, once the pallet and the containers are individually loaded onto respective conveyors and which delivers the fully stacked pallet in a condition for convenient removal from the apparatus.

Another object is to provide such an apparatus which stacks the pallet without human attention once the pallet and containers are loaded individually onto respective conveyors.

Further objects and advantages are to provide improved elements and arrangements thereof in an apparatus for stacking containers on a pallet which is dependable, automatic, and fully effective in performing its intended purposes.

BRIEF DESCRIPTION OF THE DRAWINGS

FIG. 7 is a schematic logic diagram of a control system utilized in the apparatus.

DESCRIPTION OF THE PREFERRED EMBODIMENT

Figure 1:
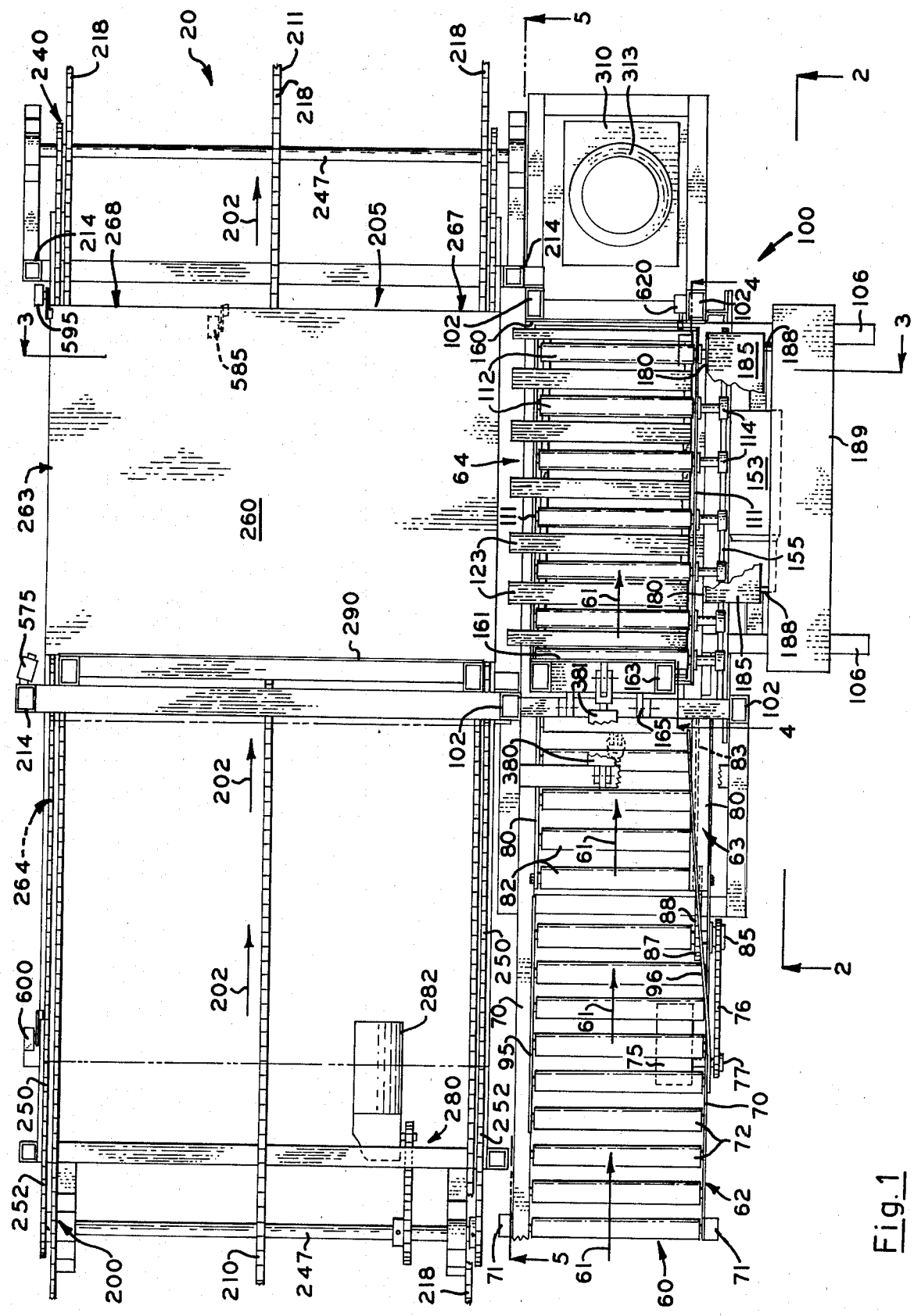
FIG. 1 is a top plan view of an apparatus embodying the principles of the present invention for stacking containers on a pallet with portions broken away for illustrative convenience.

Referring more particularly to the drawings, in FIG. 1 is shown an apparatus 20 embodying the principles of the present invention for stacking containers 22 on a pallet 24. The containers and pallet are represented by lines having double dashes at intervals while alternate positions of elements of the apparatus are represented by lines having a dot at intervals. The apparatus is supported by a floor 28.

Figure 2:
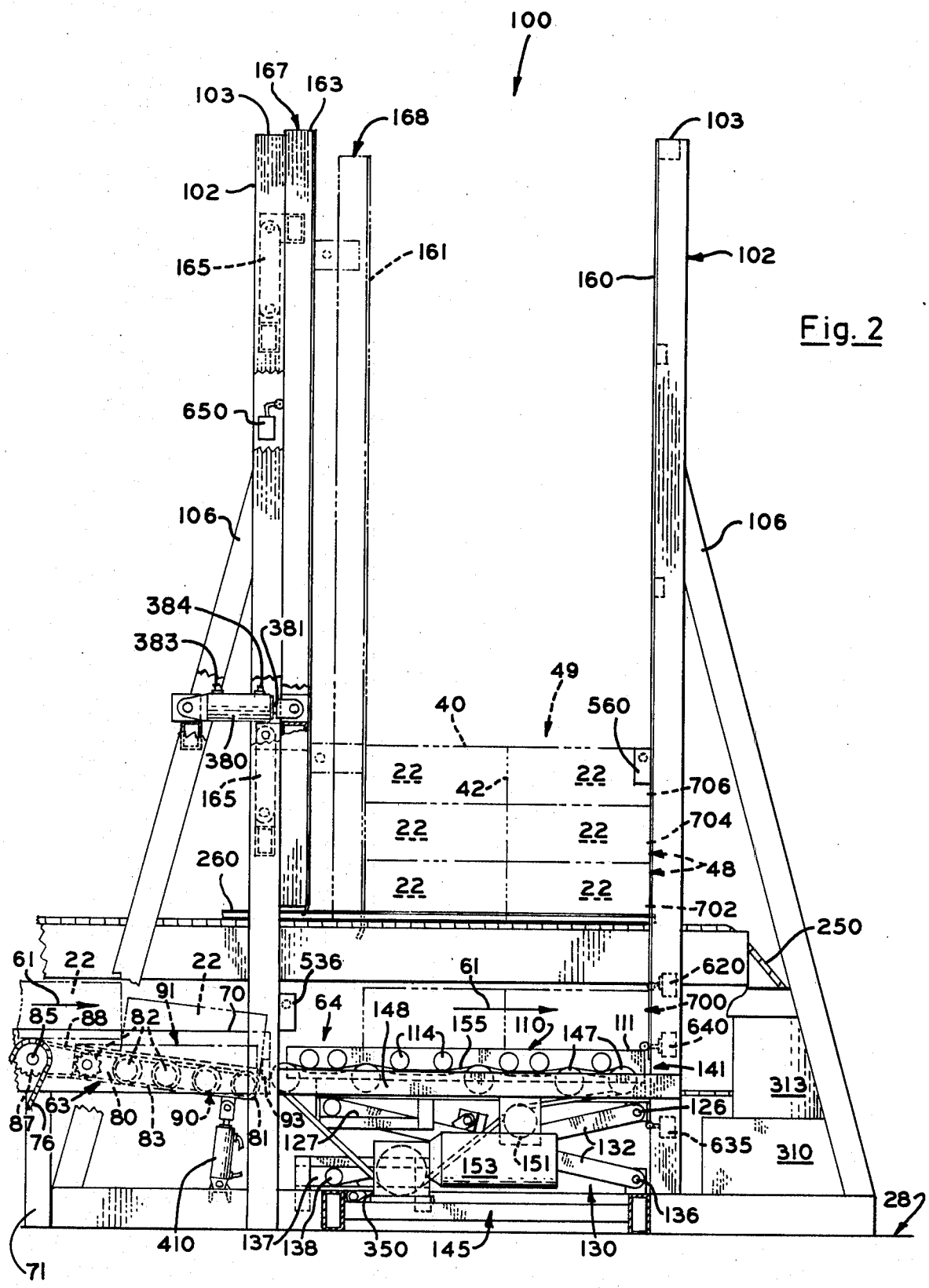
FIG. 2 is a fragmentary vertical section of the apparatus taken on line 2—2 of FIG. 1.
Figure 3:
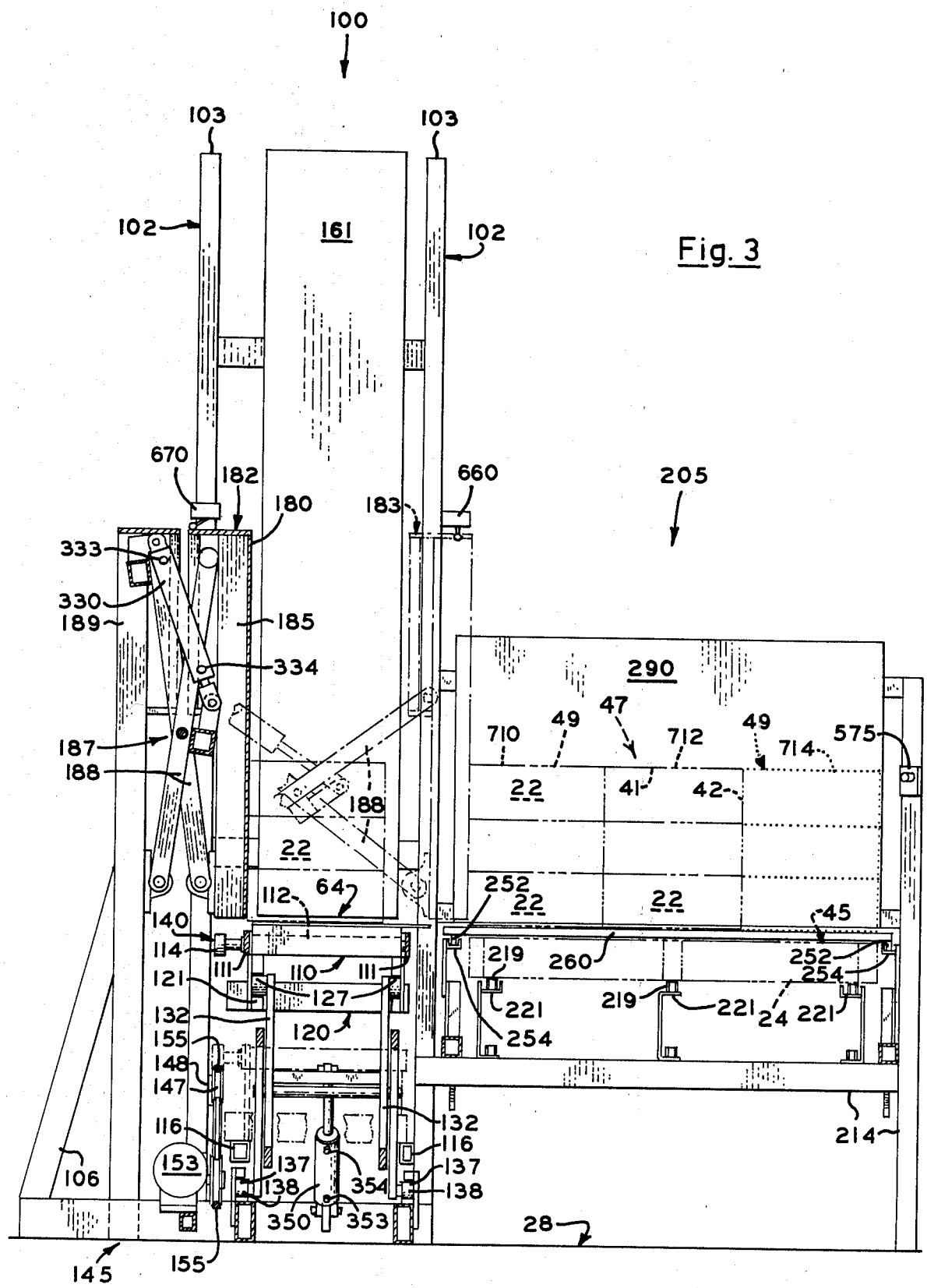
FIG. 3 is a vertical section of the apparatus taken on line 3—3 of FIG. 1.

As shown in FIGS. 2 and 3, the containers are substantially identical and are illustratively of rectangular parallelpiped form having predetermined horizontal longitudinal edges 40, horizontal transverse edges 41, and vertical end edges 42.

The pallet 24 is of well-known construction and has a horizontal rectangular upper surface 45 dimensioned, when fully loaded, to receive a pack 47 of a predetermined number of the containers arranged in juxtapositioned, predetermined disposition. The pack has a plurality of horizontal rows 48 of the containers in which the containers are arranged with their longitudinal edges in alignment. The rows are arranged vertically with the end edges of their containers aligned to form a plurality of stacks 49 of the rows while the stacks are, in turn, disposed horizontally with the transverse edges of the respective containers aligned to form the pack. Each row is depicted as having two containers, each stack is depicted as having three rows, and the pack as having three stacks. It is to be understood, however, that the apparatus of the present invention is adapted for use with a pack having other numbers and dispositions of the containers therein.

The apparatus 20 includes a horizontal live roller conveyor 60 which is adapted to transport containers 22 rested thereon successively in a predetermined direction along a predetermined horizontal path 61 with the longitudinal edges 40 of the containers parallel to the path and the end edges 42 vertically extended. Sequentially along this path, the conveyor has a horizontally fixed supply section 62 at one of its ends, a tilting intermediate section 63, and an elevationally adjustable, vertically reciprocating, terminal or elevational section 64 at its opposite end.

The conveyor has a pair of parallel, longitudinally extending rails 70 which are spaced apart a distance substantially greater than the length of a transverse edge 41 of the container. These rails extend along the supply section 62 and the intermediate section 63 of the conveyor and are fixedly supported on the floor 28 by feet 71. The supply section has a plurality of substantially identical rollers 72 rotationally mounted on and extended between these rails and continuously driven at a predetermined speed by a power drive unit 75 shown in FIG. 1 and fragmentarily shown in FIG. 2. This unit includes a motor rested on the floor and connected by an endless chain 76 to a driven sprocket fixed to a shaft extended axially from the one of the rollers adjacent to the intermediate section and through one of the rails 70. A driving sprocket 77 is fixed to this shaft between the driven sprocket and the adjacent rail. The others of these rollers are driven from this shaft in any well-known manner, not shown. The axes of these rollers lie in a substantially horizontal plane disposed a predetermined elevation above the floor.

The intermediate section 63 of the conveyor 60 is shown in FIGS. 1 and 2 and is provided with a pair of pivotal rails 80 parallel to and individually adjacent to the fixed rails 70. One end of each rail is juxtapositioned to the supply section 62 and the opposite end 81 is juxtapositioned to the terminal section 64. The pivotal rails are disposed inwardly of the fixed rails and their length is approximately one-and-one-third the length of a longitudinal edge 40 of a container 22. A plurality of rollers 82 extend transversely between and are mounted on the pivotal rails for rotation about individual axes disposed in a common plane extending longitudinally of the rails. The rollers are rotationally connected by an endless chain 83 adjacent to one of the rails and are substantially equal in diameter to the rollers 72. The one of these rollers adjacent to the supply section is provided with a shaft 85 extended axially from this roller through the pair of rails 70 and 80 transversely adjacent to the sprocket 77. The axis of this shaft is disposed substantially at the same elevation as the axes of the rollers 72. This shaft is provided with a sprocket 87 which is smaller in diameter than the sprocket 77 and is rotationally driven therefrom by an endless chain 88. The relative diameters of these sprockets is such that the rotational speed of the rollers 82 is one-and-one-half to twice the speed of the rollers 72.

The ends of the rails 80 toward the supply section 62 of the conveyor 60 are pivotally mounted on the shaft 85 and the opposite ends of the rails are adjacent to the terminal section 64. The intermediate section 63 is, therefore, adapted to pivot between an inclined or blocking position 90, shown in dash lines in FIG. 2, and an alternate horizontal or transporting position 91. In the horizontal position, the rollers 82 lie substantially in the plane of the rollers 72 while, in the inclined position, the one of the rollers 82 adjacent to the terminal section is disposed somewhat below this plane. A horizontal barrier bar 93 extends transversely between the rails 70 and is juxtapositioned to the ends 81 of the rails. The bar is disposed at an elevation where it extends above this one roller when the intermediate section is in its inclined position, but is below this one roller in the horizontal position. The bar is thus adjacent to the terminal section 64 and between it and the supply section 62.

The conveyor 60 is provided with a pair of guide bars 95 and 96, shown in FIG. 1 individual to and fixedly mounted on the rails 70. The bars extend horizontally above the intermediate section 63 and over the portion of the supply section 62 adjacent to it. The bar 95 is substantially straight and is disposed in closed, adjacent, parallel relation to the corresponding rail. This bar is depicted as toward the top of FIG. 1, while the opposite bar 96 is depicted as toward the bottom of this figure. This opposite bar curves away from its respective rail in a direction toward the terminal section 64 so that the bars converge toward the terminal section. The ends of these bars adjacent to this section are spaced apart a distance slightly greater than the length of a transverse side 41 of a container 22. A container moving along the path 61 is thus guided toward and into alignment with the bar 95 as the container approaches the terminal section.

The apparatus 20 has a stacking station 100, best shown in FIGS. 1, 2, and 3, within which the terminal section 64 of the conveyor 60 is disposed. The apparatus has four posts 102 which are fixedly mounted on the floor 28 and extend upwardly therefrom to individual upper ends 103 spaced from the floor a distance substantially greater than the sum of the height of a pack 47 and the distance of the rails 70 above the floor. The posts are, as viewed in FIG. 1, disposed approximately at the corners of a square whose sides are approximately equal in length to two-and-one-half times the length of a longitudinal edge 40 of a container 22. One pair of the posts is approximately aligned in a direction along the path 61 with the one of the rails 70 corresponding to the straight guide bar 95. The opposite pair of posts is spaced substantially transversely outwardly of the opposite one of these rails. The posts are preferably braced to the floor by a plurality of inclined braces 106.

Transversely of the path 61, one pair of the posts 102 is disposed outwardly and oppositely of the ends 81 of the pivotal rails 80. The other pair of these posts is disposed along the path 61 oppositely of the terminal section 64 of the conveyor 60 from these ends and is disposed adjacent to the terminal section. Since the supply section 62 is disposed oppositely of the intermediate section 63 from these ends, the supply section is outward of the stacking station 100.

The terminal section 64 of the conveyor 60 includes a horizontal, rectangular roller frame 110 extending along the path. This frame has a pair of opposite side bars 111 disposed parallel to the path. One of the side bars is approximately aligned with the straight guide bar 95 and the other side bar is substantially aligned with the end of the curved guide bar 96 adjacent to the terminal section. The frame has a plurality of transport rollers 112 transversely extended between and rotationally mounted on the side bars. The rollers are substantially equal in diameter to the rollers 72 and their axes are disposed in a common horizontal plane. Each roller 112 has a shaft fixed to it and extended through the one of the side bars which is aligned with the curved guide bar 96. Each of these shafts has a drive roller 114 fixed to it and disposed oppositely of this one side bar from the corresponding transport roller. A pair of horizontal bars 116, shown in FIG. 3, is fixedly mounted on the posts 102 and extends parallel to the path 61 beneath the side bars of the roller frame. These bars are disposed so that, when the roller frame is rested on them, the rollers of the frame are at substantially the elevation of the rollers 72.

Figure 4:
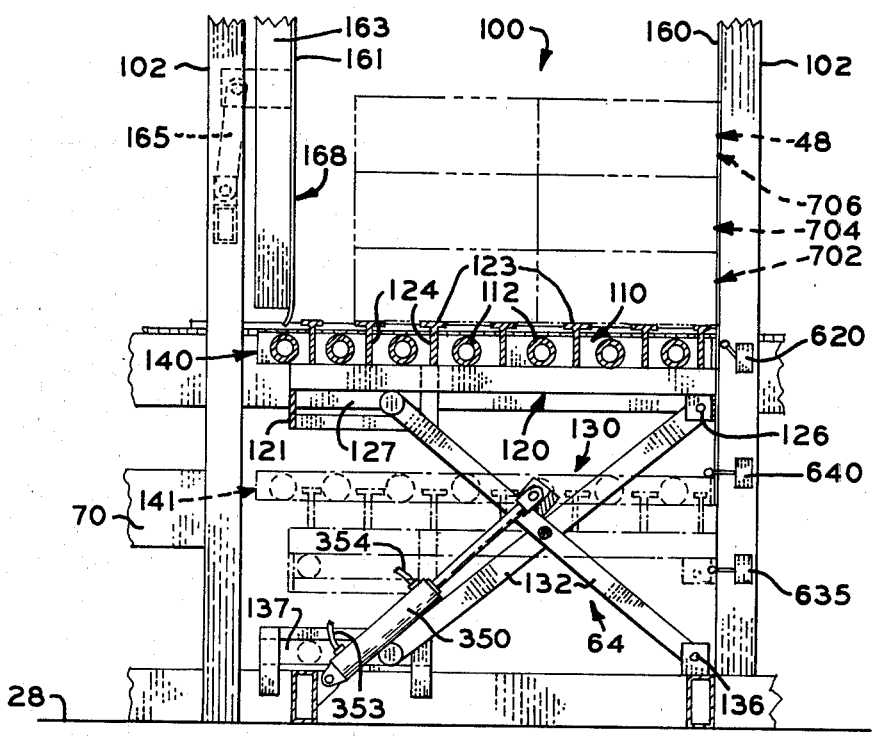
FIG. 4 is a fragmentary vertical section of the apparatus taken on line 4—4 of FIG. 1.

The terminal section 64 includes a lift table 120, shown in FIGS. 1, 3, and 4, having a rectangular frame 121 disposed beneath the roller frame. The sides of these frames are parallel and the lift table frame is adapted to have the roller frame rested thereon. The lift table has a plurality of elongated, rectangular, planar fingers 123 extended parallel to the rollers 112 and disposed in the spaces therebetween as shown in plan view in FIG. 1. The fingers are fixedly supported on and upwardly of the lift table frame by plates 124 which extend parallel to and between the rollers. The fingers are spaced above this frame a distance such that the upper surface of the fingers is disposed somewhat above the rollers 112 when the roller frame is rested on the lift table. The lower edge of each side of the table parallel to the path 61 is provided with a bore 126 at one end and a slot 127 toward the opposite end. The bars and slots are aligned transversely of the path and the slots are disposed toward the intermediate section 63.

The lift table 120 is mounted on the posts 102 for vertical reciprocation centrally therebetween by a scissors linkage 130 disposed beneath the table. This linkage has four links 132 individually corresponding to the bores 126 and slots 127 and extending diagonally downwardly therefrom beneath the frame in planes parallel to the path 61. A lug having a bore 136 is mounted on the posts 102 beneath each bore 126 and a lug having a slot 137 is similarly mounted beneath each slot 127. The corresponding bores and slots are vertically aligned. One end of each link is pivotally mounted in a bore 126 or 136 and the opposite end of the link is slidably mounted on a slot 127 or 137 by a roller 138.

As shown in FIGS. 3 and 4, the roller frame 110, table 120, and the linkage 130 forming the conveyor section 60 are adapted by the linkage 130 for movement between an elevated position 140 and an alternate lowered position 141 vertically below the elevated position. In the lowered position, the roller frame is rested on the bars 116 with the rollers 112 horizontally aligned with the rollers 72 and the lift table spaced downwardly from the roller frame so that the fingers 123 are disposed below the upper portion of the periphery of the rollers. In the elevated position, the roller frame is rested on the lift table so that the fingers are above the rollers and are disposed upwardly of the position of the rollers in the lowered position a distance somewhat greater than the length of an end edge 42 of a container 22.

The elevational conveyor section 64 is provided with a rotational drive assembly 145, best shown in FIGS. 2 and 3, for the transporting rollers 112. This assembly is mounted on the pair of the posts 102 adjacent to the drive rollers 114 and is disposed downwardly of the position of the drive rollers when the terminal section is in its lowered position 141. The assembly includes a plurality of grooved support pulleys 147 aligned transversely of the path 61 with the drive rollers. These pulleys are mounted on a horizontally elongated bracket 148 for rotation about individual axes parallel to the axes of the drive rollers and the transport rollers 112. The axes of the pulleys are disposed in a common horizontal plane disposed so that the upper portion of the periphery of each pulley is somewhat above the elevation of the lower portion of the periphery of each of the drive rollers when the conveyor section is in its lowered position. The pulleys are spaced along the path at points between the drive rollers. An idler pulley 151 is disposed below and centrally of the bracket. The assembly includes an electrical drive unit 153 which is disposed on the floor 28 and has a continuously rotating driving pulley aligned with the other pulleys of the drive assembly. An endless belt 155 is extended about the pulleys of the drive assembly and has an upper run upwardly engaged with the support pulleys. The driving pulley continuously motivates the belt so that its upper run moves in a direction opposite to that of the path 61. In the lowered position, the drive rollers engage the upper run of the belt so that the transport rollers are rotationally driven in a direction so as to urge an object rested thereon along the path. However, when the frame is raised slightly above the lowered position, the drive rollers are raised from engagement with the belt and are not rotationally driven.

The apparatus 20 includes a pair of parallel, rectangular, substantially vertical plates or clamp members 160 and 161, best shown in FIGS. 1 and 2. These plates are disposed on opposite sides of the stacking station 100 in a direction along the path 61 and extend transversely of the path across the conveyor 60. The plates are vertically elongated with their upper edges adjacent to the upper ends of the posts 102. The plate 160 is fixedly mounted on the pair of the posts disposed on opposite sides of the intermediate section 63 and disposed toward the stacking station. The lower edge of this plate is disposed in downwardly adjacent relation to the rollers 112 when the conveyor section 64 is in its lowered position 141. As a result, the plate extends upwardly of the conveyor section when the section is in its elevated position 140. Due to this disposition, the plate is a barrier extended transversely of the path which engages each row 48 of containers 22 moving therealong and retains the containers in the row at the stacking station.

The plate 161 is on the opposite side of the station 100 and the conveyor section 64 from the fixed plate 160, and is movably mounted on the pair of posts 102 opposite the pair thereof on which the fixed plate is mounted. The lower edge of the movable plate is disposed substantially at the elevation of the fingers 123 when the section is in the elevated position 140. The movable plate is provided with a unitarily constructed, rectangular backing frame 163 disposed on the side of the movable plate opposite to the fixed plate. The backing frame is pivotally connected to the adjacent pair of posts by four generally vertical links 165 of equal length disposed individually adjacent to each corner of this frame. The upper ends of the links are pivoted to the frame for movement about horizontal axes extending transversely of the path 61. The lower end of each link is similarly pivoted to the adjacent one of the posts. The movable plate is thus mounted for movement toward and from the fixed plate and is adapted for movement between a retracted position 167 in which the movable plate is adjacent to the posts on which it is mounted, and an alternate extended position 168. Since the links are substantially equal in length, the plates remain parallel as the movable plate moves between these positions. In the extended position, the plate is disposed in a direction toward the fixed plate along the path 61 from the retracted position. In the retracted position, these plates are spaced apart a distance somewhat greater than the length of row 48 of containers 22 along the path, while in the extended position, these plates are spaced a distance approximately equal to this length.

The apparatus 20 is provided with a rectangular, upright pusher plate 180, best shown in FIGS. 1 and 3, which is mounted on the pair of the posts 102 which are adjacent to the curved guide bar 96. This plate is mounted for horizontal movement transversely of the path 61 across the stacking station 100 between a retracted position 182 and an alternate, extended position 183. The pusher plate is vertical and extends parallel to the path with the lower edge of the plate disposed slightly above the elevation of the fingers 123 when the conveyor section 64 is in its elevated position 140. The length of the pusher plate along the path is slightly less than the length of a row 48 of containers 22 and the plate is disposed so as to move between the clamp plates 160 and 161 when the movable one of these plates is in its retracted position 167. As shown in plane view in FIG. 1, in the retracted position, the pusher plate is aligned along the path with the adjacent end of the curved guide bar 96. When the plate is in its extended position, it is disposed substantially outwardly of the fingers 123 in a direction therefrom oppositely of this bar.

The pusher plate 180 is provided with a backing frame 185, which is disposed at the side thereof which is opposite the stacking station 100 in the retracted position, and with a scissors linkage 187 similar to the linkage 130. The linkage of the pusher plate includes four links 188 interconnecting the frame thereof with a frame 189 which is fixedly connected to the adjacent pair of the posts 102. The links extend diagonally and each has a pivotally mounted lower end and an upper end provided with a roller and slidably received in a vertical slot corresponding to one of the slots 127 or 137.

Figure 5:
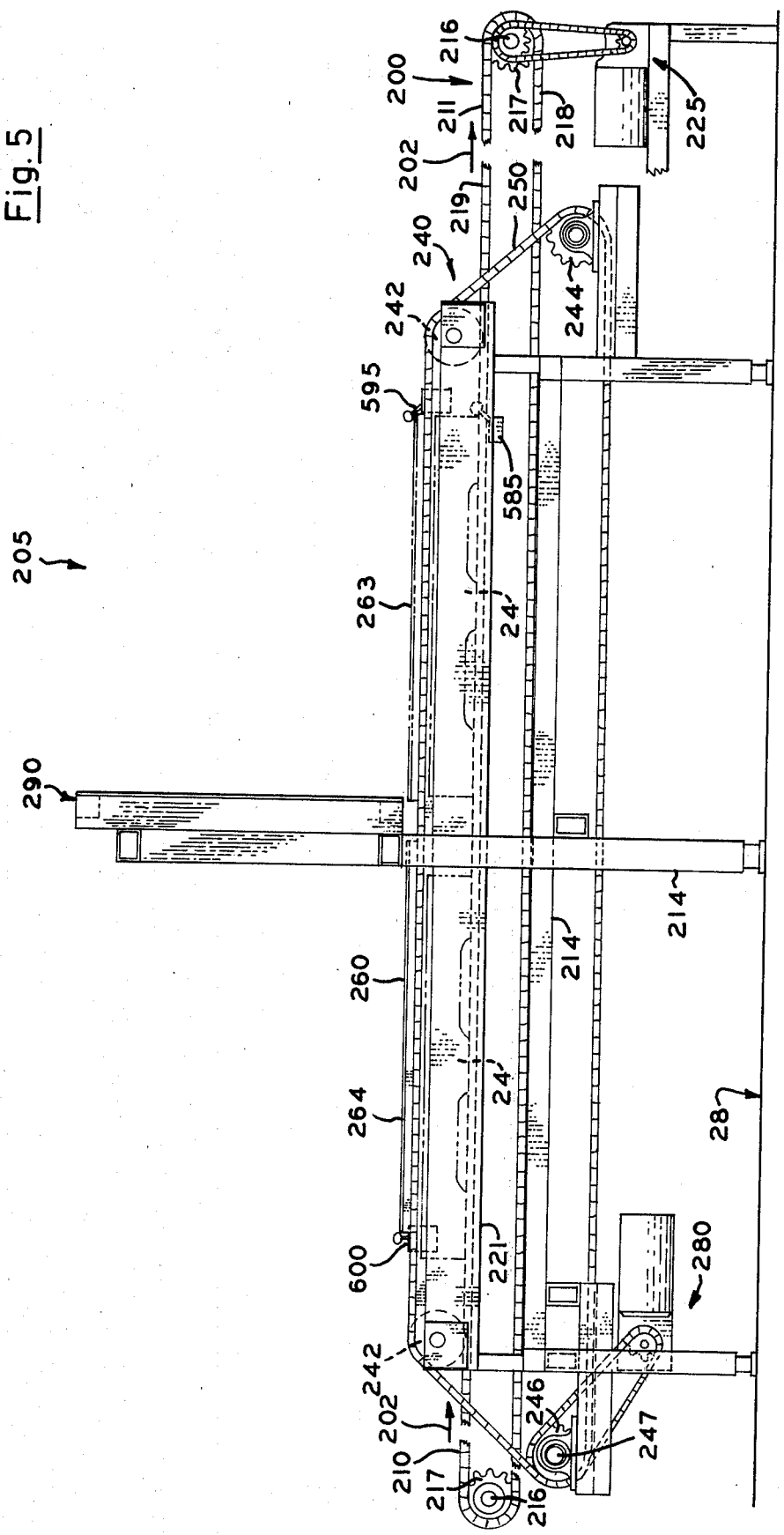
FIG. 5 is a vertical section of the apparatus taken on line 5—5 of FIG. 1.

The apparatus 20 has a pallet conveyor 200, best shown in FIGS. 1, 3, and 5, adapted to transport a pallet 24 rested on the conveyor with the surface 45 of the pallet upwardly and horizontally disposed along a horizontal path 202 extending parallel to and in the same direction as the path 61. The pallet conveyor is juxtapositioned to the side of the stacking station 100 which is opposite the retracted position 182 of the pusher plate 180. The central portion of the pallet conveyor is aligned with the stacking station in a direction transversely of the path 61, defining a loading station 205 transversely adjacent to the stacking station. The length of the loading station along the paths 61 and 202 is approximately equal to the corresponding length of the stacking station. The pallet conveyor thus extends in opposite directions from the loading station and is adapted to convey a pallet to the loading station along the path 202 and then from this station along the same path.

The pallet conveyor 200 has a receiving end 210 disposed oppositely of the direction of travel along the path 202 and has a discharge end 211 opposite the receiving end. The pallet conveyor includes a frame 214 rested on the floor 28 and fixedly connected to the posts 202. Each end of this conveyor is provided with a transverse, horizontal shaft 216 rotationally mounted on the frame. Each shaft has three sprockets 217 spaced axially therealong and aligned with a corresponding sprocket of the other shaft. The outer sprockets of each shaft are spaced a distance slightly less than the width of a pallet transversely of the path 202. These sprockets are substantially identical and each aligned pair thereof is looped by an endless chain 218 having an upper run 219. The upper runs are individually supported on channels 221 mounted on the frame and extended along the path 202 so that the upper runs are disposed in a common horizontal plane. This plane is spaced above the floor a distance such that the surface 45 of a pallet 24 at the loading station 205 and rested on these runs is disposed somewhat below the elevation of the fingers 123 when the conveyor section 64 is in its elevated position 140.

The pallet conveyor 200 is provided with a power drive assembly 225 mounted on the frame 214 at the discharge end 211. This assembly includes a motor unit 227 having, as shown in FIG. 7, a live terminal 228 and a ground terminal 229. This assembly has a driven sprocket mounted on the adjacent one of the shafts 216 and aligned with a driving sprocket of the motor unit. These sprockets are interconnected by an endless chain and the motor unit is selectively energizable at its live terminal so as to drive the upper runs 219 in a direction along the path 202.

The apparatus 20 has a plate conveyor 240 mounted on the frame 214. Each end of this conveyor is provided with a pair 242 of idler sprockets. These sprockets are disposed so that the upper portions of their peripheries are disposed substantially at the elevation of the surface 45 of a pallet 24 rested on the upper runs 219. Each pair is aligned axially and is mounted on the frame for rotation about a horizontal axis extending transversely of the paths 61 and 202. The sprockets of each pair are spaced oppositely and somewhat outwardly of the outer pair of the chains 218. One of these pairs of sprockets is disposed adjacent to the loading station 205 at the side thereof toward the discharge end 211 of the pallet conveyor 200. The other pair of these sprockets is spaced from the loading station toward the receiving end 210 of the pallet conveyor a distance somewhat greater than the length of the loading station along the path 202. The plate conveyor includes a pair of return sprockets 244 and a pair of driving sprockets 246. These pairs of sprockets are aligned about individual axes parallel to the axes of the idler sprockets and disposed therebeneath. One of the return sprockets and one of the driving sprockets are aligned with a sprocket of each of the pairs of idler sprockets. The return sprockets are spaced toward the discharge end of the pallet conveyor from the loading station and are individually rotationally mounted on the frame 214. The driving sprockets are spaced somewhat toward the receiving end of the pallet conveyor from the adjacent idler sprocket and are fixedly and coaxially mounted on a shaft 247 which is, in turn, rotationally mounted on the frame.

The plate conveyor 240 includes a pair of endless chains 250 individually looping the four of the sprockets 242, 244, and 246 which are disposed at one side of the pallet conveyor 200. Each chain has an upper run 252 extending horizontally between the upper portion of the peripheries of its respective idler sprockets 242. The conveyor has a pair of support bars 254 mounted on the frame 214 and extended individually beneath the upper runs. The bars are disposed so that the corresponding run rests thereon and is maintained thereby in a substantially horizontal, linear disposition.

The apparatus 20 has a horizontal pallet plate 260 mounted on the upper runs 252 for movement therewith. The thickness of the plate is such that its upper surface is disposed substantially at the elevation of the fingers 123 when the conveyor section 64 is in its elevated position 140. The plate extends transversely across these upper runs and the length of the plate along the path 202 is substantially equal to the length of the loading station 205. The plate conveyor is thus adapted to transport the plate in a substantially horizontal plane along the upper runs between an extended position 263, in which the plate is at the loading station 205 and is disposed to be superimposed on a pallet 24 thereon, and an alternate, retracted position 264. The retracted position is disposed from the extended position in a direction opposite to the direction of movement of a pallet along the path. The plate thus has one transverse portion 267 which is adjacent to the stacking station 100 when the plate is in the extended position and another transverse portion 268 opposite this one portion.

The plate conveyor 240 has a power drive assembly 280, shown in FIGS. 5 and 7, adjacent to the driving sprockets 246. This assembly includes a selectively reversible electric motor unit 282 mounted on the frame and provided with a driving sprocket which is aligned with a driven sprocket mounted on the shaft 247. The driving and driven sprocket are looped by a chain for rotational drive of this shaft from the motor unit. The motor unit has a selectively energizable extend terminal 283, a selectively energizable retract terminal 284, and a ground terminal 285. The drive assembly is adapted to drive the plate conveyor 240 so as to move the plate 260 in a direction from its extended position 263 toward its retracted position 264 when the extend terminal is energized and in the opposite direction when the retract terminal is energized.

The apparatus 20 has a planar, rectangular wall 290, best shown in FIGS. 1, 2, and 3, fixedly mounted on the frame 214 and extended transversely of the path 202 across the upper runs 252 of the chains 250 of the plate conveyor 240. The lower edge of the wall is disposed in parallel, closely adjacent relation to the upper side of the plate and the upper edge of the wall is spaced upwardly of the plate a distance somewhat greater than the height of a pack 47 of containers 22. The wall is thus disposed between the extended position 263 and the retracted position 264 of the plate and is disposed from the extended position in a direction from the extended position toward the retracted position.

Figure 6:
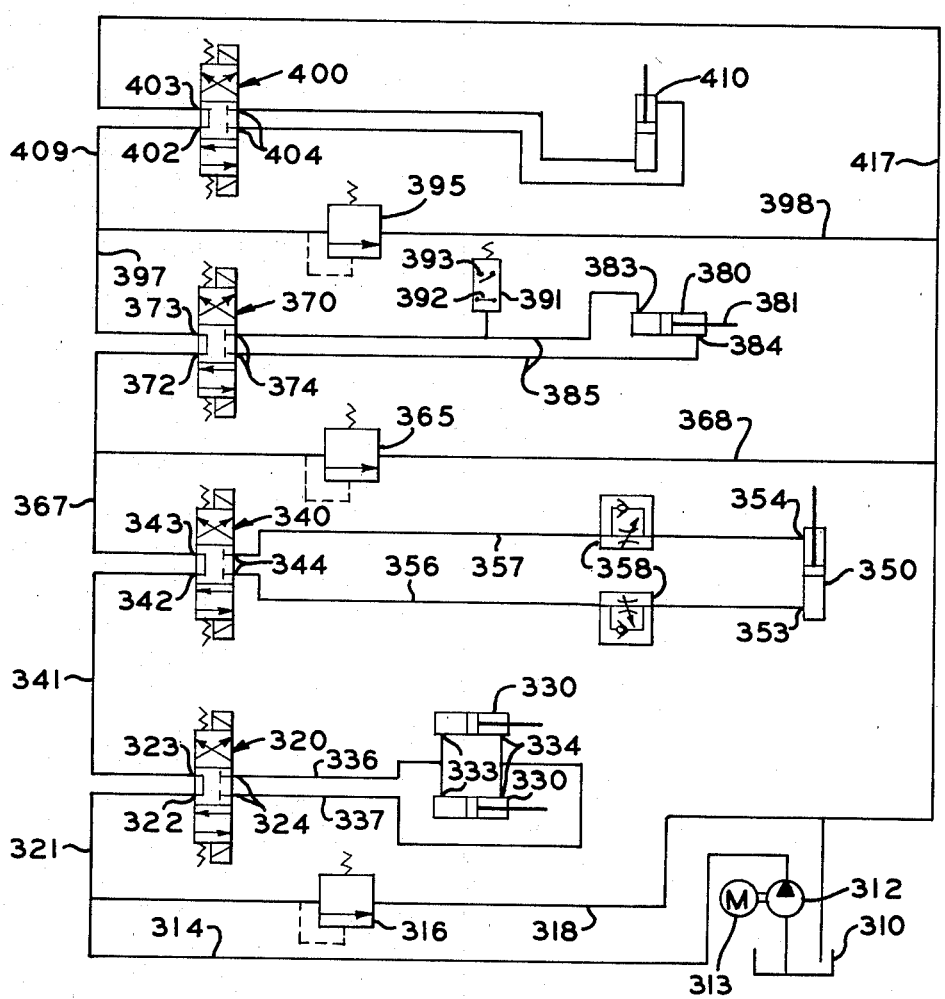
FIG. 6 is a schematic diagram of a hydraulic system utilized in the apparatus.

The apparatus 20 is provided with a hydraulic system which utilizes well-known elements and is schematically represented in FIG. 6. Certain of the elements are also depicted in the other figures. This system includes a reservoir 310, also shown in FIGS. 1 and 2, from which hydraulic fluid under pressure is discharged from a pump 312, which is powered by a motor 313, through a conduit 314 to a first pressure relief valve 316. This valve limits the hydraulic pressure supplied to other elements of the hydraulic system to a predetermined value by returning the pump discharge to the reservoir through a conduit 318 when this pressure is exceeded.

When the valve 318 is closed, hydraulic pressure is delivered from this valve to a pusher plate control valve 320 of well-known construction, shown in FIGS. 6 and 7, through a conduit 321. This control valve is a four-way, three-position, spring-centered solenoid valve having a fluid inlet port 322, a fluid discharge port 323 connected to the conduit, and a pair of cylinder ports 324. This control valve is provided with an extend electrical terminal 326 and a retract electrical terminal 327. When the extend terminal is energized, one of the cylinder ports is hydraulically connected to the inlet port and the other cylinder port is connected to the outlet port. These hydraulic connections are reversed when the retract connection is electrically energized. When neither of the electrical connections are energized, the cylinder ports are blocked and the inlet port is hydraulically connected to the outlet port so that hydraulic fluid under pressure is delivered through the valve from its inlet port to its outlet port.

The hydraulic system includes a pair of pusher plate hydraulic cylinders 330, best shown in FIGS. 1, 3, and 6. These cylinders are extendible and contractible and individually mechanically interconnect one of the links 188 and the frame 189 in a manner such that extension of the cylinders moves the plate toward its extended position 183 and contraction of the cylinders moves the plate toward its retracted position 182. Each cylinder has an extend hydraulic connection 333 and a contract hydraulic connection 334. The extend connections are connected in parallel to one of the cylinder ports 324 by a hydraulic conduit 336 and the contract connections are connected in parallel by a conduit 337 to the other of the cylinder ports. These conduits are arranged in a well-known manner so that energization of the extend electrical terminal 326 causes the cylinders to extend and the pusher plate to move toward its extended position. Conversely, energization of the retract electrical terminal 327 causes the cylinders to contract and move the pusher plate toward its retracted position.

As shown in FIG. 6, the outlet port 323 of the valve 320 is hydraulically connected to a conveyor section elevating control valve 340 through a conduit 341. The elevating control valve is substantially identical to the valve 320, having an inlet port 322, an outlet port 323 which is connected to the conduit, and a pair of cylinder ports 324. The elevating control valve is provided with an elevate electrical terminal 346 and a lower electrical terminal 347 which correspond, respectively, to the connections 326 and 327.

The hydraulic system includes a conveyor section elevating hydraulic cylinder 350 shown in FIGS. 2 and 6. This cylinder is similar to the cylinders 330 and has an extend connection 353 and a contract connection 354. This cylinder mechanically interconnects one of the links 132 with the corresponding lug having one of the slots 137 in a manner such that extension of the cylinder moves the vertically movable elements of the conveyor section 64 toward the elevated position 140 and contraction of the cylinder moves these elements toward the lowered position 141. The extend connection is connected in a well-known manner to one of the cylinder ports 344 by a conduit 356 and the other of the cylinder ports is connected to the contract connection 354 by a conduit 357 so that energization of the elevate terminal 346 causes these elements to move toward the lowered position. The conveyor section 64 is thus selectively reciprocated between these positions by appropriate energization of these terminals. These conduits are provided with individual flow control valves 358 of well-known construction, each valve having a selectively variable restriction which limits the flow of hydraulic fluid to the cylinder and a check valve which by-passes the restriction as fluid flows from the cylinder. These valves thus provide for individual adjustment of the speed at which the conveyor section moves toward each of its positions.

The hydraulic system includes a second pressure relief valve 365, shown in FIG. 6, connected to the port 343 by a conduit 367. When the pressure in this conduit reaches a predetermined value less than the pressure at which the first relief valve 316 opens, the second valve opens allowing fluid to pass from it through a conduit 368 to the conduit 318 and to the reservoir 310.

The hydraulic system includes a clamp plate control valve 370, shown in FIGS. 6 and 7, which is substantially identical to the valve 320 having an inlet port 372, an outlet port 373, a pair of cylinder ports 374, an extend electrical terminal 376, and a retract electrical terminal 377. The inlet port is hydraulically interconnected with the conduit 367 so that this port receives hydraulic pressure limited to that at which the second relief valve 365 opens.

A horizontally disposed contractible and extendible hydraulic cylinder 380, shown in FIGS. 2 and 6, mechanically interconnects the backing frame 163 and the adjacent brace 102 at a location adjacent thereon to one of the lower of the links 165. This cylinder has a movable piston actuated by pressure within the cylinder and connected to the backing frame by a rod 381. This cylinder has an extend hydraulic connection 383 and a retract connection 384. These connections are hydraulically interconnected to the ports 374 of the valve 370 by a pair of conduits 385 in a manner such that energization of the extend terminal 376 causes hydraulic pressure to be supplied through one of the conduits to the extend connection so that the movable clamp plate 161 is urged toward its extended position 168. Conversely, energization of the terminal 377 results in the movable plate moving toward its retracted position 167 and from the fixed plate 160. The cylinder is thus a power drive for moving the movable plate toward the fixed clamp plate 160. The pressure in this one conduit is, of course, substantially equal to the pressure within the cylinder so that the force exerted by the movable plate as it moves toward the fixed plate is proportional to the pressure in this conduit. This one conduit is provided with a pressure sensor switch 391, shown in FIGS. 6 and 7, having a normally closed contact 392 and a normally open contact 393. When the pressure in this conduit reaches a predetermined value corresponding to a desired maximum force exerted by the pressure plate, these contacts are motivated in a well-known manner to positions reversed from their normal positions. The switch is thus responsive to the desired maximum clamping force to be exerted by the movable plate.

The hydraulic system has a third pressure relief valve 395, shown in FIG. 6, connected by a supply conduit 397 to the outlet port 373 of the valve 370 and by a conduit 398 and the conduits 368 and 318 to the reservoir 310. This valve functions in a manner similar to the second relief valve 365 to limit the fluid pressure in the supply conduit. The third valve, however, opens at lower pressure than the second valve so that pressure in the supply conduit is limited to this lower pressure.

An intermediate conveyor section control valve 400 of the hydraulic system is shown in FIGS. 6 and 7, and is substantially identical to the valve 320, having an inlet port 402, an outlet port 403, and pair of cylinder ports 404, a raise electric terminal 406, and a lower electric terminal 407. This valve has its inlet port interconnected by a conduit 409 to the conduit 397. This valve is associated with a generally vertical, contractible and extendible hydraulic cylinder 410, best shown in FIGS. 2 and 6, which mechanically interconnects the rails 80 of the intermediate conveyor section 63 and the adjacent braces 102. This control valve and cylinder are hydraulically connected in a manner similar to that in which the valve 370 and cylinder 380 are connected so that energization of the raise terminal 406 causes the cylinder to extend and move the intermediate conveyor section into its horizontal position 91. Conversely, energization of the lower terminal 407 results in movement of this section toward its inclined position 90. The length of the stroke of this cylinder and its points of connection are such that its extreme positions define these positions of the conveyor section. A conduit 417 interconnects the outlet port of the container stop valve with the conduit 368 for return of hydraulic fluid to the reservoir 310.

It should be noted that since each of the valves 320, 340, 370, and 400 block their respective cylinder ports when their respective electrical terminals are de-energized, the associated cylinders 330, 350, 380, 410 cannot extend or contract when the corresponding terminals are de-energized. Further, since the valves are hydraulically connected in series between the pump 312 and the reservoir 310, fluid cannot flow toward or from the cylinder associated with any one valve if any other valve is energized except to the extent that all of the cylinders associated with all of the energized valves are free to move.

The apparatus 20 includes an electrical control system schematically represented in FIG. 7; certain position-sensing elements of the system are also represented in FIGS. 1 through 5. For illustrative convenience, FIG. 7 depicts only those elements of a control system required for automatic operation of the apparatus. Certain of these elements, well known to those familiar with automatic control systems, are represented by labeled blocks. The letters "PC" within a block identify a photo-cell, the letter "R" identifies a relay, the letter "D" identifies a time delay relay; the word "count" identifies a counter; the letters "LS" identify a limit switch; and the letters "PR.S" identify a pressure switch. Certain other circuit elements, as for electrical circuit protection and manual operation of the apparatus, would be readily apparent to those skilled in the art and are omitted.

In FIG. 7, the various circuits which, when completed, energize electrical terminals of previously described elements of the apparatus 20 are represented by horizontal lines leading to these elements which are depicted at the right of the figure together with an associated ground bus 500. At the left of the figure is depicted a power bus 501 energized by a source 502 of alternating current electrically connected between the buses. At the top of the figure are depicted the sensing elements of the control system which are subsequently to be described. The output of each sensing elements is represented by vertical dash lines intersecting contacts in the horizontal circuit lines which are actuated by the sensor.

The control circuits, from top to bottom of FIG. 7, are a reset circuit 510, an intermediate conveyor section 63 raise circuit 512, an intermediate conveyor section lower circuit 513, a terminal conveyor section 64 elevate circuit 516, a terminal conveyor section lower circuit 517, a movable clamp plate 161 extend circuit 520, a clamp plate retract circuit 512, a pusher plate 180 extend circuit 524, a pusher plate retract circuit 525, a pallet plate 260 extend circuit 528, a pallet plate retract circuit 529, and a pallet conveyor circuit 532.

The sensors, from left to right in FIG. 7, include a container-counter circuit indicated generally by the numeral 535. This circuit has a photo-cell 536 disposed, as shown in FIG. 2, between the intermediate conveyor section 63 and the elevational section 64. The photo-cell provides a signal to a counter 538 as a container 22 passes from the intermediate section to the elevational section. The counter has a power terminal 539 connected to the bus 501, an output terminal 541 which is energized as a signal that two containers, the number of containers in a row 48, has passed the photo-cell, and a reset terminal 542 which sets the container counter to zero when connected to the ground bus 500. By modifying the counter to energize its output terminal when some other number of containers have passed the photo-cell, the apparatus can be adapted to assemble some other number of containers in a row within the limitation set by the length of the elevational section along the path 61. The counter output terminal is connected to a delay relay 545 having a power terminal 546 connected to the bus, an output indicated by the dash lines 547 which is activated one second after the counter output terminal is energized, and a reset terminal 548 which, when connected to the ground bus, readies the relay for another delay. The delay output actuates a normally open contact 551 in the circuit 516. The output terminal 541 of the counter is also connected to a relay 555 which has an output 556 which actuates a normally closed contact 557 in the circuit 512 and a normally open contact 558 in the circuit 513.

The control system has a stack complete circuit having a photo-cell 560, also shown in FIG. 2, disposed adjacent to the stacking station 100 at an elevation so as to detect the presence of the uppermost, or third, one of the rows 48 of containers 22 in a stack 49 at this station. The elevation at which this photo-cell is mounted can be varied to adapt the apparatus 20 for use in stacking some other number of rows in each stack. The presence of such a row causes the photo-cell to energize a relay 562 having an output 563. This output actuates a normally open contact 565 in the circuit 521 and a normally open contact 566 in the circuit 524. This latter contact is paralleled by a contact of a latch relay 568. The latch relay contact closes when the latch relay is energized through a conductor 569 from the extend terminal 326 of the pusher plate control valve 320.

The control system has a pack complete photo-cell 575, also shown in FIGS. 1 and 3, disposed above the plate conveyor 240 at a point adjacent to the edge of the portion 268 of the plate 260. This cell is positioned at an elevation where it senses the presence of the upper one of the rows 48 of a stack 49 thereof disposed adjacent to said edge. As subsequently to be described, this row is only present when a complete pack 47 is disposed at the loading station 205. When the photo-cell senses such a row, it energizes an associated relay having an output 577. This output actuates a normally closed contact 581 in the circuit 528, a normally open contact 582 in the circuit 529, and a normally open contact 583 in the circuit 532.

A pallet in place limit switch 585, also shown in FIGS. 1 and 5, is mounted on the frame 214 so as to engage the leading edge of a pallet 24 moving along the path 202 at a point therealong where the pallet is disposed at the loading station 205. Such engagement, as indicated by the dash lines 586, actuates a normally open contact 588 in the circuit 524 which is connected in series with the contacts 566 and 568. This engagement also actuates a normally closed contact 589 in the circuit 532 which is connected in parallel with the contact 583.

A pallet plate extended limit switch 595, also shown in FIG. 5, is mounted on the frame 214 adjacent to the loading station 205 so as to be engaged by the leading edge of the pallet plate 260 as the plate attains its extended position 263. This engagement actuates a normally open contact 597 of the circuit 524 in series with the contact 588 and actuates a normally closed contact 598 in the circuit 528 which is in series with the contact 581.

A pallet plate retract limit switch 600 is mounted on the frame 214 oppositely of the wall 290 from the loading station so as to be engaged by the plate 260 as it attains its retracted position 264. This engagement actuates a normally closed contact 602 which is connected in series in the circuit 529 with the contact 582 and a normally open contact 603 in the circuit 532. This latter contact is connected in series between the contact 583 and a terminal 605. The previously described contact 589 is also connected to the terminal 605 and is thus connected in parallel with the series connected contacts 583 and 603. The terminal 605 is directly connected to the terminal 228 of the pallet conveyor motor unit 227 by a conductor 607.

The plate conveyor extend circuit 528 and retract circuit 529 have respective interlock relays 610 and 611 which open one of these circuits when the other circuit energizes the corresponding terminal 283 or 284 of the motor unit 282. The relay 610 has a contact connected in series between the contact 598 and the terminal 283. This contact is opened when the relay is energized by a conductor 613 connected to the retract terminal 284. The relay 611 has a contact which is connected in series between the contact 602 and the terminal 284. This contact is opened when the relay 611 is energized through a conductor 614 connected to the extend terminal 283.

The apparatus 20 includes a conveyor section elevated limit switch 620 mounted, as shown in FIGS. 1, 4, and 5, on one of the posts 102 adjacent to the stacking station 100. This switch is disposed so as to be engaged by the lift table 120 as the conveyor section 64 attains its elevated position 140. This engagement actuates a normally open contact 621 in the circuit 510, a normally open contact 622 in the circuit 517, a normally open contact 623 in the circuit 520, a normally open contact 624 and a normally closed contact 625 in the circuit 521, a normally open contact 626 in the circuit 524, and a normally closed contact 627 in the circuit 516.

The contact 622 is connected to the bus 501 and is connected in parallel with a contact of a latch relay 630 which is energized through a conductor 631 connected to the lower terminal 347 of the control valve 340 which is associated with the elevational section 64 of the conveyor 60. The latch relay contact closes when the relay is energized. One side of the contact 621 is connected in parallel to the respective reset terminals 542 and 548 of the counter 538 and the delay relay 545. The other side of this contact is connected to the ground bus 500 so that the counter and relay are reset when this contact closes.

The contact 623 is connected in series between the bus 501 and other contacts, subsequently to be described, of the clamp plate extend circuit 520. The contact 627 is connected in series with the contact 551 of the elevate circuit 516 associated with the conveyor section 64.

A conveyor section lowered limit switch 635 is mounted similarly to the switch 620 but is disposed downwardly of it so as to be engaged by the lift table 120 when the conveyor section 64 attains the lowered position 140. This engagement closes a normally open contact 637 in the circuit 512 which is connected in series with the contact 557 and actuates a normally closed contact 638 in the circuit 517.

The last mentioned contact 638 is connected in series with the parallel connected contact 622 and the contact of the latch relay 630. The contact 393 of the pressure switch 391 is connected in series between the contact 638 and the lower terminal 347 of the control valve 340 associated with the conveyor section 64.

A clamp plate retract initiate switch 640, also shown in FIG. 4, is mounted between the limit switches 620 and 635 on the post on which these switches are mounted. The initiate switch is thus engaged momentarily by the lift table 120 as the elevational section 64 moves in a stroke toward its elevated position 140 from its lowered position 141. This engagement actuates a normally closed contact 642 in the circuit 520 and a normally open contact 643 in the circuit 521.

The contact 642 is connected in series between the contact 623 of the limit switch 620 and the normally closed contact 392 of the pressure switch 391.

The contact 643 is associated with three parallel paths of the clamp plate retract circuit 521. These paths connect the bus 501 with a terminal 645. One of these paths is a series connection of the previously described contacts 565 and 624. Another of these paths is a series connection of the previously described contact 625 and the contact 643. The third path includes the contact of a latch relay 647 which is energized from the retract terminal 377 of the control valve 370 associated with the movable clamp plate 161.

The electrical control system includes a clamp plate retract limit switch 650 mounted on one of the posts 102 as shown in FIG. 2 and disposed so as to be engaged by the backing frame 163 of the plate 161 when this plate attains its retracted position 167. This engagement actuates a normally closed contact 652 in the clamp plate retract circuit 521 and a normally open contact 653 in the pusher plate extend circuit 524.

The contact 652 is connected in series between the terminal 645 and the contact of an interlock relay 655 which is energized through a conductor 656 from the lower terminal 347 of the control valve 340 associated with the elevational conveyor section 64. The relay contact is directly connected to the retract terminal 377 of the control valve 370 and is opened when the relay is energized. This relay thus prevents the movable clamp plate 161 from retracting while the conveyor section is moving toward the lowered position 141.

The control system has a pusher plate extended limit switch 660 which, as shown in FIG. 3, is mounted on one of the posts 102 adjacent to the loading station 205 and disposed so as to be engaged by the pusher plate 180 as it attains its extended position 183. This engagement actuates a normally closed contact 662 in the pusher plate extend circuit 524, a normally open contact 663 in the pusher plate retract circuit 525, and a normally open contact 664 in the pallet plate retract circuit 529. The connections of these contacts in their respective circuits are now described.

The contact 662 is connected between the contact 653 of the pressure plate retract limit switch 650 and the extend terminal 326 of the pusher plate control valve 320. The contact 663 is connected directly between the bus 501 and the retract terminal 327 of this control valve.

The contact 664 is directly connected electrically between the contact of the interlock relay 611 and the retract terminal 284 of the motor unit 282 of the pallet plate conveyor 240. The contact 664 is also connected in parallel with the contact of a latch relay 666 which is energized from the retract terminal through a conductor 667. The latch relay contact is closed when the relay is so energized.

The control system includes a pusher plate retract limit switch 670 mounted, as shown in FIG. 3, on one of the posts 102 disposed oppositely of the stacking station 100 from the loading station 205. This switch is disposed so as to be engaged by the backing frame 185 of the pusher plate 180 as this plate attains its retracted position 182. This engagement actuates a normally open contact 672 in the intermediate conveyor section 63 raise circuit 512, a normally open contact 673 in the elevational conveyor section 64 raise circuit 524, a normally open contact 674 in the clamp plate extend circuit 520, and a normally closed contact 675 in the pusher plate retract circuit 525. The contact 672 is connected directly between the contact 637 and the raise terminal 406 of the control valve 400; the contact 673 is directly connected between the contact 627 and the elevate terminal 346 of the control valve 340; and the contact 674 is directly connected between the contact 392 and the extend terminal 376 of the control valve 370.

The contact 675 is connected in series with the contact of a latch relay 680 and these two contacts are in turn connected in parallel with the contact 663. The latch relay contact is closed when the relay is energized from the retract terminal 327 of the control valve 320 through a conductor 681.

OPERATION

The operation of the described embodiment of the present invention is believed to be clearly apparent and is briefly summarized at this point.

Initially, it is assumed there is neither a container 22 or a pallet 24 at the apparatus 20, but that the various elements of the apparatus are disposed to receive a pallet and containers to be stacked thereon. When so disposed, since there is initially no pallet 24 at the loading station 205, the contact 589 is closed energizing the pallet conveyor motor unit 227 so as to transport a pallet placed on this conveyor along the path 202 toward the loading station 205. When the pallet reaches the loading station, the pallet engages the switch 595, opening the contact 589 and stopping the conveyor so that the pallet remains at the station.

Since there are initially no containers at the loading station 205 for the photo-cell 575 to detect, the contact 581 is closed and, if the pallet plate 260 is not in its extended position 263, the contact 598 is closed. The extend terminal 283 of the pallet conveyor motor unit 282 is thus energized so that the pallet plate is motivated toward its extended position. When this position is attained, the contact 598 is opened so that the plate is, as shown in FIGS. 3 and 5, disposed in a superimposed disposition to a pallet 24 delivered to the loading station in the manner previously described.

In the initial disposition of the apparatus 20, the continuously driven supply section 62 and intermediate section 63 are motivated so as to transport a container placed on the supply section along the path 61 toward the intermediate section. Initially, the counter 538 is reset, the elevational section 64 is in the lowered position 141, and the pusher plate 180 is in its retracted position 182 so that the contacts 557, 637, and 672 are closed. The raise terminal 406 is thus energized so that, as previously described, the intermediate section is raised to its horizontal position 91 by the cylinder 410. Containers successively placed on the supply section are thus transported in succession onto the elevational section 64 at the stacking station 100.

As each container 22 passes onto the intermediate section 63, it is accelerated in relation to a following container by the more rapid rotation of the rollers 82 in relation to the rollers 72 so that a gap is created between each adjacent pair of containers as the leading container of the pair moves onto this conveyor section. Each gap is detected by the photocell 536 and a signal sent to the counter as previously described. When two containers have passed the photo-cell, the counter output terminal 547 is energized so that the contact 557 is opened, de-energizing the terminal 406 of the valve 400, and closing the contact 558 to energize the lower terminal 407 of the valve. As a result, the cylinder 410 contracts, lowering the intermediate conveyor section 63 to its inclined position 90. The next container, therefore, engages the barrier 93 and is blocked from moving from the intermediate section onto the elevational section 64. Following containers are blocked in turn as they engage an already blocked container. The rollers 72 and 82 skid beneath the blocked containers.

When the conveyor section 63 moves into its inclined position 90, the two containers received on the elevational section 64 are urged into a row 48 against the fixed plate 160, as indicated in FIG. 2 by the numeral 700, by the rotation of the rollers 112, since these rollers are, as previously described, driven in the lowered position 141 by the belt 155. One second after counter 538 signals that these containers have been received on the elevational section while at its lowered position 141, the delay relay 545 closes the contact 551. At this time, the contacts 637 and 672 are closed since the elevational section is in its lowered position and the pusher plate 180 is in its retracted position 182. The elevate terminal 346 of the control valve 340 is energized through these contacts so that the cylinder 350 extends, moving the elevational section toward its elevated position 140.

Initially, as the elevational section 64 moves, the roller frame 110, which is rested on the bars 116, remains stationary and the lift table 120 rises so that the row 48 of containers 22 indicated by the arrow 700 is engaged from beneath by the fingers 123 and raised from the rollers 112. As the lift table continues upward, it engages the roller frame 110 carrying it upwardly from the bars together with the table. As the lift table continues to rise, it, of course, continues to elevate the row of containers supported on the fingers and the roller frame toward their positions corresponding to the elevated position 140.

As the table 120 rises, it engages the retract initiate switch 640, opening the contact 642 and the clamp extend circuit 520 and closing the contact 643. At this point, since the conveyor section 64 is not yet in its elevated position 140 so that the contact 625 is closed and since the relay 655 is not energized because this section is not being lowered, closure of the contact 643 energizes the retract terminal 377 of the control valve. The movable clamp plate 161 is thus caused to move toward its retracted position 167. When this retract terminal is energized, the latch relay 647 is also energized so that the retracting movement continues until the plate attains its retracted position. When this position is attained, the switch 650 is engaged, opening the contact 632 and de-energizing the retract terminal and the latch relay.

While the plate 161 is retracting, the elevational conveyor section 64 continues to rise until its elevated position 140 is attained and the limit switch 620 is engaged. This engagement also closes the contact 621, resetting the counter 538 and the delay relay 545 in preparation for the assembly of another row 48 of containers 22. This engagement also closes the contact 626 of the pusher plate extend circuit 524; however, since an entire stack 49 is not yet assembled, the stack complete photocell 560 has not energized the relay 562 and the contact 566 is not closed. As a result, this extend circuit is not energized and the pusher plate 180 remains in its retracted position 182.

When the elevational conveyor section 64 attains the elevated position 140 and engages the limit switch 620, as just described, the contact 622 of the lower circuit 517 for this conveyor section is also closed, energizing the latch relay 630 and closing the contact thereof in parallel with the contact 622. However, since at this moment the clamp plate 161 is not extended, the pressure switch 391 is not actuated so that the contact 393 is open and the lower terminal 347 of the control valve 340 associated with this conveyor section is not energized. The elevational conveyor section thus remains in the elevated position for the time being.

At this point, the contact 623 of the switch 620 is closed; the contact 642 is closed since the lift table has moved beyond the retract initiate switch 640; and the contact 392 of the pressure switch 391 is closed, since, as just described, the movable clamp plate 161 is not extended. The extend circuit 520 associated with this plate is thus complete, energizing the terminal 376 and causing the valve 370 to supply hydraulic fluid from its inlet port 372 through the appropriate one of the conduits 385 to the extend connection 383 of the cylinder 380. The plate is thereby extended and urged into engagement with the elevated row 48 indicated by the arrow 702. This row is thus clamped between the movable plate and the fixed plate 160 so that the row is supported between the plates. The clamping force exerted on the row increases as the extending movement ceases; however, as previously described, when the pressure in the one conduit attains a value corresponding to the desired maximum clamping force, the pressure switch 391 is actuated and the contact 393 opens so that the extend terminal is de-energized and the valve closes the one conduit from the inlet port. When this occurs, the clamping force cannot increase, but, since the cylinder ports 374 are blocked, this force does not decrease substantially. As a result, the elevated row remains clamped between the plates 160 and 161.

When the pressure switch 391 is actuated, the contact 393 is closed, completing the lower circuit 517 associated with the elevational conveyor section 64 so that this section now returns to its lowered position 141. Although the contact 622 opens as soon as the elevational section leaves its elevated position 140, the return movement continues due to the latch relay 630 until the lowered position limit switch 635 is engaged, opening the contact 638 to de-energized the lower circuit and the latch relay.

As the elevational conveyor section 64 returns to its lowered position 141, the row 48 of containers 22 clamped between the plates 160 and 161 at the position 702 remains at the elevation to which this row was raised when the conveyor section attained its elevated position 140. Since, as previously described, the fingers 123 were at the elevation of the plate 260 in the elevated position, the lower surface of the containers in this elevated row are approximately at the elevation of the pallet plate 260 as shown in FIG. 3.

When the elevational conveyor section 64 returns to its lowered position 141 and engages the switch 635, the contact 637 is closed so that the raise terminal 406 of the valve 400 associated with the intermediate conveyor section 63 is energized. As a result, the intermediate section is motivated into its horizontal position 91 by the cylinder 410 and two additional containers 22 are again fed onto the elevational section and assembled into a second, subsequently received row 48. This row is elevated in the manner previously described beneath the previously received and elevated row so that the previously received row is lifted by the second row into the position indicated by the numeral 704 as the second row moves into the position 702. The subsequently received row is thus bottom loaded to form a stack of two rows at the stacking station with the previously received row upward of the subsequently received row.

It should be noted that, while the conveyor section 64 rises toward its elevated position 140 with a subsequently received one of the rows 48, the retract initiate switch 640 is engaged, causing the movable clamp plate 161 to retract from the fixed clamp plate 160 previously described. Any previously received row or rows are thus released by the clamp plates so as to rest on the subsequently received row so that all of the rows are supported on the conveyor section when it is in the elevated position. The retraction of the movable plate occurs somewhat before the elevated position is attained. The relative timing of these events is controlled by the elevation of the retract initiate switch and the speed of the elevational movement of the conveyor section as determined by the appropriate one of the flow control valves 358.

Since, at this time, the stack of rows 48 at the stacking station 100 includes only two rows, the photo-cell 560 does not energize the relay 562 and the elevational section 64 again returns to its lowered position 141 where a third row of containers is assembled on it in a manner similar to the manner in which the previous rows are assembled. The third row is then elevated and bottom loaded onto the incomplete stack of two rows to form a complete stack 49 of three rows, elevating the first row into an uppermost position indicated by the numeral 706 and the second row into the position 706 while the third row is at the position 702 and thus at the elevation of the pallet plate 260. This plate, as previously described, is disposed at the adjacent loading station 205 with a pallet 24 disposed beneath the plate on the stopped pallet conveyor 200.

At this point, a complete stack 49 is both clamped between the plates 160 and 161 and engaged by the elevational conveyor section 64. At the corresponding point, when the first two of the rows were elevated, the conveyor section returned to its lowered position 141 and the movable clamp plate remained in its extended position 168. Now, however, the one of the rows 48 at the position 706 is sensed by the photo-cell 560 as the elevated position 140 is attained so that the contacts 565 and 566 are closed. Closure of the contact 566 energizes the latch relay 568. Since the conveyor section is in its elevated position engaging the switch 620 and closing the contact 624, closure of the contact 565 completes the retract circuit 521. The movable clamp plate is thereby caused to move to its retracted position 167 leaving the completed stack rested on the conveyor section.

When the movable plate 161 attains its retracted position 167, it engages the switch 650, closing the contact 653 in the pusher plate extend circuit 524. At this point, the contact 566 is closed, as just described, and the contacts 588 and 597 are closed, respectively, by the presence of the pallet 24 and the pallet plate 260 at the loading station 205. The extend terminal of 327 of the control valve 320 associated with the pusher plate 180 is thus energized so that this plate commences a stroke, powered by the cylinders 330, from its retracted position 182 toward its extended position 183. During this stroke, the pusher plate engages the stack on the elevational conveyor section 64 and pushes the stack onto the portion 267 of the pallet plate and into a position thereon adjacent to the stacking station and indicated in FIG. 2 by the numeral 710. As the stack is pushed from the stacking station, the photo-cell 560 no longer senses a row 48 at the position 706 so that the contact 565 in the clamp plate retract circuit 521 and the contact 566 in the pusher plate extend circuit are opened. However, the movable clamp plate is already retracted and the latch relay 568 is energized, bypassing the contact 566. As a result, the movement of the stack from the stacking station does not affect the clamp plate or the stroke of the pusher plate.

When the pusher plate 180 reaches its extended position 183, it engages the corresponding limit switch 660 opening the contact 662 in the pusher plate extend circuit 524 and closing the contact 663 in the corresponding retract circuit 525. The extend circuit is thus de-energized and the retract circuit energized so that a return stroke of the pusher plate to its retracted position 182 is initiated as soon as its extended position is attained. Closure of the contact 663 results in energization of the latch relay 680 so that the return stroke continues although the contact 663 opens as soon as the plate moves from its extended position. The return stroke continues until the limit switch 670 is engaged, opening the contact 675 and de-energizing the retract circuit and the latch relay. Engagement of the pusher plate extend limit switch 660 also closes the contact 664 in the pallet plate retract circuit 529. However, since there is not a stack at the portion 267 of this plate opposite the stacking station 100, the contact 582 associated with the pack complete photo-cell 575 is open and the pallet plate remains in its extended position 263.

When the pusher plate 180 resumes its retracted position 182 and engages the limit switch 670 as previously described, the contact 674 of this switch in the clamp plate extend circuit 520 is closed so that hydraulic pressure is applied to the extend connection 383 and the pressure switch 391. The plate is thereby urged to extend until the pressure switch is actuated, as previously described, opening the contact 392 and closing the contact 393 in the lower circuit 517 associated with the conveyor section 64. Closure of the latter contact initiates the return of the conveyor section to its lowered position 141. Contact 673 of the conveyor section elevate circuit 516 was also closed when the pusher plate reached its retracted position so that the apparatus 20 is ready to assemble a second stack.

The assembly of a second one of the stacks 48 of the stacking station 100 and the pushing of this stack onto the pallet plate 260 now commences in the manner similar to that in which the previous stack was assembled and pushed onto the pallet plate. As the second stack is pushed onto the plate, it engages the previously assembled stack, pushing it further onto the plate toward the portion 268 thereof and into the position identified by the numeral 712 in FIG. 2. Since the pack 47 is not yet complete, there is no output from the photo-cell 575 so that a third stack is assembled at the stacking station and pushed onto the pallet plate, pushing the second stack to be assembled into the position 712 and pushing the first stack into a position 714, depicted in dot lines adjacent to the edge of the portion 268 of the pallet plate. The pack 47 is thus assembled on the pallet plate by the pushing thereon of successively assembled stacks.

When the pack 47 is fully assembled on the pallet plate 260, the photo-cell 575 senses the one of the stacks 49 in the position 714 so that the contact 581 in the pallet plate extend circuit 528 is opened and the contact 582 in the corresponding extend circuit 529 is closed, causing the retract terminal 284 of the motor unit to be energized and the plate is to be transported beneath the wall 290 in a direction toward its retracted position 264. As the plate moves beneath the wall, the pack is carried by the plate into engagement with the wall which maintains the pack at the loading station while the plate continues to move and slides from beneath the pack so that the pack descends gravitationally on the pallet 24 as the plate is withdrawn.

When the pallet plate 260 attains its retracted position 264, it engages the limit switch 670, opening the contact 602 in the pallet plate retract circuit 529 so that the plate stops in the retracted position. This engagement also closes the contact 603. The pallet conveyor motor unit 227 is then energized since the contact 583 actuated by the pack complete photo-cell 575 is closed due to the pack still being disposed in a position for sensing by this photo-cell. Energizing of the motor unit causes the pallet 24, which is now loaded with a pack 47, to be transported on the pallet conveyor 200 from the loading station 205 toward the discharge end 211 of the pallet conveyor where the loaded pallet is disposed for removal from the apparatus 20. This movement is continued movement of the pallet conveyor results in an empty pallet placed on the receiving end 210 of the conveyor being transported into the loading station and the return of the pallet plate into its extended position 263 as previously described.

While these movements of the pallet plate 260 and the pallet conveyor 200 are occuring, the pusher plate 180 returns to its retracted position 182 and the elevational conveyor section 64 returns to its lowered position 141 and the assembly of another pack 47 to be loaded on an empty pallet begins. The assembly of one stack 49 of the containers 22 commences immediately. However, the contacts 588 and 597 in the pusher plate extend circuit 524 remain open, respectively, until a pallet 24 is in place at the loading station 205 and until the pallet plate returns to its extended position 263. As a result, the next stack to be assembled is not pushed toward the loading station 205 until an empty pallet and the pallet plate are properly disposed at the loading station for the assembly of another pack 47.

The apparatus 20 has thus assembled a pack 47 having a predetermined number of stacks 49, each stack having a predetermined number of rows 48 which include a predetermined number of containers 22. This assembly has been accomplished and the loaded pallet delivered at the discharge end 211 for convenient removal from the apparatus 20 without manual intervention once the pallet and containers are loaded onto their respective conveyors 200 and 60. The containers are neatly and vertically stacked since the containers were guided by and/or clamped during assembly by the vertical plates 160 and 161, the pusher plate 180, and the wall 290. The containers are tightly engaged since the containers in each row were clamped together in end-to-end relation by the clamp plates and since the earlier stacks to be assembled were pushed onto the pallet plate by engagement with the later assembled stacks.

Although the apparatus has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In an apparatus for stacking containers on a pallet in a pack having a stack of the containers:
   A. means for conveying a pallet to and from a loading station with the pallet in a substantially horizontal attitude and at a predetermined elevation at the loading station;
   B. a plate;
   C. means mounting the plate for movement between a substantially horizontal attitude in superimposed relation to said predetermined elevation at the loading station and a position retracted therefrom;
   D. a conveyor having a section adjacent to the loading station for reciprocation between a lowered position to receive the containers and an elevated position;
   E. a pair of clamping members disposed oppositely of and extended upwardly from the conveyor section when the section is in the elevated position, one of the members being movable from the other member and toward the other member to clamp a row of containers received on the section between the members and to support said row with the section subsequently disposed in the lowered position to receive a subsequent row of containers for elevation beneath the clamped row of containers to assemble said rows into a stack having the previously received row upwardly of the subsequently received row;
   F. power drive means selectively motivating said one clamping member to and from said other clamping member;
   G. control means responsive to the presence of the conveyor section at a position between said positions thereof as the section moves during the stroke toward the elevated position from the lowered position, said control means controlling the power drive of the clamping member to motivate said one member from said other member and to release a row clamped therebetween so that said row is supported on the section when the section attains the elevated position;

H. means for moving successive rows of stacked containers from the conveyor section onto the plate at the loading station when such section is at the elevated position; and I. means for retracting the plate from the loading station and from beneath the pack while a pallet is disposed therein whereby the pack descends onto said pallet.

2. The apparatus of claim 1 wherein said section of the conveyor includes a frame; a plurality of axially horizontal rollers rotationally mounted thereon in parallel, spaced disposition; and a lift table disposed downwardly of the frame and wherein the conveyor includes means for supporting the frame when the section is in said lowered position; powered means for moving the table upwardly and downwardly between positions corresponding to said lowered position and said elevated position, the frame being rested on said supporting means as the table moves downwardly and being engaged by the table and carried therewith upwardly of the supporting means into the elevated position as the table moves upwardly; a plurality of horizontal fingers parallel to the rollers and disposed in the spaces therebetween, the fingers being mounted on the table at a distance thereabove such that, when the section is in the lowered position and the frame is rested on the supporting means, the fingers are downwardly of the rollers and a container received at the section rests thereon and such that, when the table engages the frame as the table moves upwardly, the fingers extend upwardly of the rollers to support a container previously received on the rollers in upwardly spaced relation thereto for movement with the section toward the elevated position.

3. In an apparatus for stacking containers on a pallet in stacks, wherein each stack has a predetermined number of rows of containers:

A. means for conveying a substantially horizontal pallet to and from a loading station;

B. a substantially horizontal plate;

C. means for conveying the plate to and from the loading station in superimposed relation to the pallet;

D. a conveyor having a section disposed at a stacking station adjacent to the loading station for reciprocation between a lowered position to receive a row of containers and an elevated position;

E. a pair of clamping members disposed oppositely of and extended upwardly from the conveyor section when the section is in the elevated position, one of the members being movable from the other member and toward the other member to clamp a row of containers received on the section between the members and to support said row with the section subsequently disposed in the lowered position to receive a subsequent row of containers for elevation beneath the clamped row of containers to assemble said rows into a stack having the previously received row upwardly of the subsequently received row;

F. means for moving successive rows of stacked containers from the stacking station onto the plate at the loading station;

G. means for assembling the rows of stacked containers into a pack on the plate;

H. means for withdrawing the plate from beneath the pack when the pallet is in the loading station whereby the pack descends upon the pallet;

I. power drive means selectively motivating the moving means to move a stack of said successive rows of stacked containers onto the plate;

J. power drive means selectively motivating said one clamping member from said other clamping member;

K. control means responsive to the presence of the conveyor section at a position between said positions thereof as the section moves during a stroke toward the elevated position from the lowered position, said control means controlling the power drive of the clamping member to motivate said one member from said other member and release a row clamped therebetween so that said row is supported on the section when the section attains the elevated position; and L. control means responsive to the presence at the stacking station of the uppermost row of a stack having the predetermined number of said rows when the section is in the elevated position, said control means controlling the power drive of the moving means to move said stack onto the plate when said uppermost row is so present.

4. An apparatus for stacking containers on a pallet in rows wherein each row has a predetermined number of containers the apparatus comprising:

A. a conveyor for transporting a substantially horizontal pallet to and from a loading station;

B. a substantially horizontal plate;

C. a conveyor for transporting the plate in a substantially horizontal plane to and from the loading station in superimposed relation to the pallet when the pallet is located in said station;

D. a conveyor for transporting containers rested thereon successively to a stacking station adjacent to the loading station, said conveyor having an elevationally adjustable section and having a member movable between a blocking position in which the transport of a container to the elevational section is blocked at a point adjacent to said section and a transporting position at which said transport occurs;

E. a counter having a reset connection and providing a signal when said number of containers passes said point after the counter is reset;

F. a power drive operably connected to said member and actuated by said signal to move the member into the blocking position;

G. means at the stacking station for assembling containers transported thereto in a row in the elevationally adjustable section whereby elevation of the section elevates such row;

H. a sensor responsive to the elevation of said section to reset the counter when said section is elevated;

I. clamp means mounted adjacent to the stacking station operable to clamp and to support the row of containers elevated by the elevationally adjustable section whereby a further row of containers can be assembled therebelow to bottom load the stack of containers at the stacking station;

J. means for pushing a stack of containers from the elevational section onto the plate while the plate is in the loading station;

K. means for holding the stack of containers in predetermined position on the plate at the loading station; and L. means for sliding the plate from under the stack when the pallet is in the loading station whereby the stack descends upon the pallet.

5. An apparatus for stacking containers on a pallet comprising:
  A. a conveyor for transporting a substantially horizontal pallet to and from a loading station;
  B. a substantially horizontal plate;
  C. a conveyor for transporting the plate in a substantially horizontal plane to and from the loading station in superimposed relation to the pallet when the pallet is located in said station;
  D. a conveyor for transporting containers rested thereon successively to a stacking station adjacent to the loading station, said conveyor having an elevationally adjustable section;
  E. means at the stacking station for assembling containers transported thereto in a row in the elevationally adjustable section whereby elevation of the section elevates such row;
  F. clamp means mounted adjacent to the stacking station operable to clamp and to support the row of containers elevated by the elevationally adjustable section whereby a further row of containers can be assembled therebelow to bottom load the stack of containers at the stacking station,
     (1) a pair of parallel, upwardly extended plates disposed on opposite sides of the stacking station, one of said plates being mounted at the station for movement toward and from the other of said plates, and
     (2) a power drive for urging said one plate toward said other plate to exert clamping force on a row of containers to support the same therebetween;
  G. means for pushing a stack of containers from the elevational section onto the plate while the plate is in the loading station;
  H. means for holding the stack of containers in predetermined position on the plate at the loading station; and
  I. means for sliding the plate from under the stack when the pallet is in the loading station whereby the stack descends upon the pallet.

6. The apparatus of claim 5 wherein the clamp means includes a sensor responsive to said clamping force and operably connected to said power drive to limit said force to a predetermined value.

7. The apparatus of claim 5 wherein the clamp means includes a source of fluid under pressure; a movable, fluid pressure actuated member operably connected to said one plate to urge said one plate toward said other plate with a force proportional to said pressure; a conduit between the source and said member; a valve in the conduit to close the conduit and limit fluid pressure at the member; and a pressure sensor responsive to the pressure at the member, the sensor controlling the valve to close the conduit when the pressure at the member attains a predetermined value corresponding to a predetermined maximum value of said clamping force.

8. The apparatus of claim 5 wherein:
  A. each stack of containers has a predetermined number of rows therein;
  B. the apparatus further comprises means for releasing the clamp means from a stack of containers elevated by the elevational section when the stack has said predetermined number of rows and the elevational section is elevated; and
  C. the stack pushing means comprises an upright member mounted for movement across the stacking station toward and from the loading station when the clamp means is so released and a stack of containers is so elevated, said member engaging the stack and pushing the stack from the elevational section onto the horizontal plate.

9. An apparatus for stacking containers on a pallet comprising:
  A. a loading station having means for supporting a pallet at predetermined elevation;
  B. a stacking station adjacent to the loading station;
  C. a conveyor for transporting containers along a horizontal path disposed downwardly of said elevation to the stacking station, the conveyor including an elevational section having an elevated position and a lowered position and having
     (1) a frame disposed at the stacking station, for elevational movement thereat,
     (2) a plurality of horizontal, parallel rollers disposed in spaced relation along the path and rotationally mounted on the frame for elevational movement therewith,
     (3) means for supporting the frame in a position for the reception of containers transported along the path when the section is in the lowered position,
     (4) a lift table disposed beneath the frame,
     (5) powered means for raising the table to engage the frame and to lift the frame from the support means as the section moves toward the elevated position and to lower the frame onto the support means, disengaging the table from the frame as the section moves toward the lowered position,
     (6) a plurality of horizontal fingers mounted on the table for movement therewith in vertical alignment with the spaces between the rollers, the fingers extending upwardly of the rollers when the lift table is engaged with the frame so that the fingers lift a container received on the rollers from the rollers and toward said predetermined elevation as the section attains the elevated position and the fingers being below the rollers when the section is in the lowered position so that containers being transported along the path engage the rollers; and
  D. means for moving a container from the fingers to the loading station when the section is in the elevated position.

* * * * *

UNITED STATES PATENT AND TRADEMARK OFFICE
CERTIFICATE OF CORRECTION

PATENT NO. : 4,354,786

DATED : October 19, 1982

INVENTOR(S) : Blaine W. Spitler

It is certified that error appears in the above-identified patent and that said Letters Patent are hereby corrected as shown below:

Column 7, line 24, delete "plane" and substitute ---plan---.

Column 18, line 55, change "393" to ---392---.

Column 19, line 53, change "are" to ---were---.

Column 19, line 57, delete "706", second instance, and substitute ---704---.

Column 21, line 50, delete "is" and substitute ---or---.

Signed and Sealed this

Eleventh Day of January 1983

[SEAL]

Attest:

GERALD J. MOSSINGHOFF

Attesting Officer     Commissioner of Patents and Trademarks